(12) United States Patent
Wang et al.

(10) Patent No.: US 12,126,598 B2
(45) Date of Patent: Oct. 22, 2024

(54) MANAGING EXCHANGES BETWEEN EDGE GATEWAYS IN A CLOUD ENVIRONMENT TO SUPPORT A PRIVATE NETWORK CONNECTION

(71) Applicant: VMware LLC, Palo Alto, CA (US)

(72) Inventors: Yong Wang, San Jose, CA (US); Awan Kumar Sharma, Pune (IN); Abhishek Goliya, Pune (IN); Xinhua Hong, Campbell, CA (US); Bhargav Puvvada, Pune (IN)

(73) Assignee: VMware LLC, Palo Alto, CA (US)

( * ) Notice: Subject to any disclaimer, the term of this patent is extended or adjusted under 35 U.S.C. 154(b) by 382 days.

(21) Appl. No.: 17/715,993

(22) Filed: Apr. 8, 2022

(65) Prior Publication Data

US 2023/0239274 A1 Jul. 27, 2023

(30) Foreign Application Priority Data

Jan. 21, 2022 (IN) .............................. 202241003506

(51) Int. Cl.
*H04L 12/66* (2006.01)
*H04L 9/40* (2022.01)
*H04L 61/2592* (2022.01)

(52) U.S. Cl.
CPC .......... *H04L 63/0272* (2013.01); *H04L 12/66* (2013.01); *H04L 61/2592* (2013.01); *H04L 63/0485* (2013.01)

(58) Field of Classification Search
CPC . H04L 12/66; H04L 61/2592; H04L 63/0485; H04L 63/164; H04L 63/0272
See application file for complete search history.

(56) References Cited

U.S. PATENT DOCUMENTS 7,738,452 B1 * 6/2010 O'Rourke ............. H04L 69/085
370/389
2020/0366562 A1 * 11/2020 Mayya ................ H04L 43/0811

FOREIGN PATENT DOCUMENTS

KR 100346355 B1 * 7/2002

* cited by examiner

*Primary Examiner* — Brian F Shaw
(74) *Attorney, Agent, or Firm* — Quarles & Brady LLP

(57) ABSTRACT

Described herein are systems, methods, and software to manage secure tunnel communications in multi-edge gateway computing environments. In one implementation, a control system identifies an edge gateway from a plurality of edge gateways to support a private network tunnel. The control system further identifies addressing attributes associated with communications directed over the private network tunnel and configures the plurality of edge gateways to forward packets associated with the addressing attributes to the identified edge gateway, wherein the edge gateway can process and forward the packets over the private network tunnel.

20 Claims, 9 Drawing Sheets

MANAGING EXCHANGES BETWEEN EDGE GATEWAYS IN A CLOUD ENVIRONMENT TO SUPPORT A PRIVATE NETWORK CONNECTION

RELATED APPLICATION

Benefit is claimed under 35 U.S.C. 119(a)-(d) to Foreign Application Serial No. 202241003506 filed in India entitled "MANAGING EXCHANGES BETWEEN EDGE GATEWAYS IN A CLOUD ENVIRONMENT TO SUPPORT A PRIVATE NETWORK CONNECTION", on Jan. 21, 2022, by VMware, Inc., which is herein incorporated in its entirety by reference for all purposes.

BACKGROUND

In computing environments, edge gateways (or, simply, "edges") are used to provide software defined overlay networks with access to external networks such as other overlay networks, physical networks, and/or wide area networks such as the Internet. Host computing systems in the environment may execute virtual machines, containers, or some other virtualized interface (hereinafter referred to as "virtual compute endpoints") attached to the software defined overlay network. The edge gateways may be used to provide various services, including stateful services, on the ingress and egress packets to the various endpoints, including firewall operations, filtering, encryption/decryption, or some other operation with respect to the packets. For example, a packet may be received at an edge from an external network, processed by the edge, and forwarded to a virtual compute endpoint on a destination host in the environment.

For improved throughput and redundancy, a plurality of edges may be deployed, each providing stateful services for a different set of virtual compute endpoints or set of internet protocol (IP) addresses. If a packet for a particular flow arrives at the wrong edge in the cluster, it must be forwarded (or "punted") to the correct edge for stateful service processing.

SUMMARY

The technology described herein manages exchanges between edge gateways in a cloud environment to support a private network connection with a remote gateway. In one implementation, a control service identifies an edge gateway from a plurality of edge gateways to support a private network tunnel. The control system further identifies addressing attributes associated with communications directed over the private network tunnel and configures the plurality of edge gateways to forward packets with the addressing attributes to the edge gateway.

DETAILED DESCRIPTION

Figure 1:
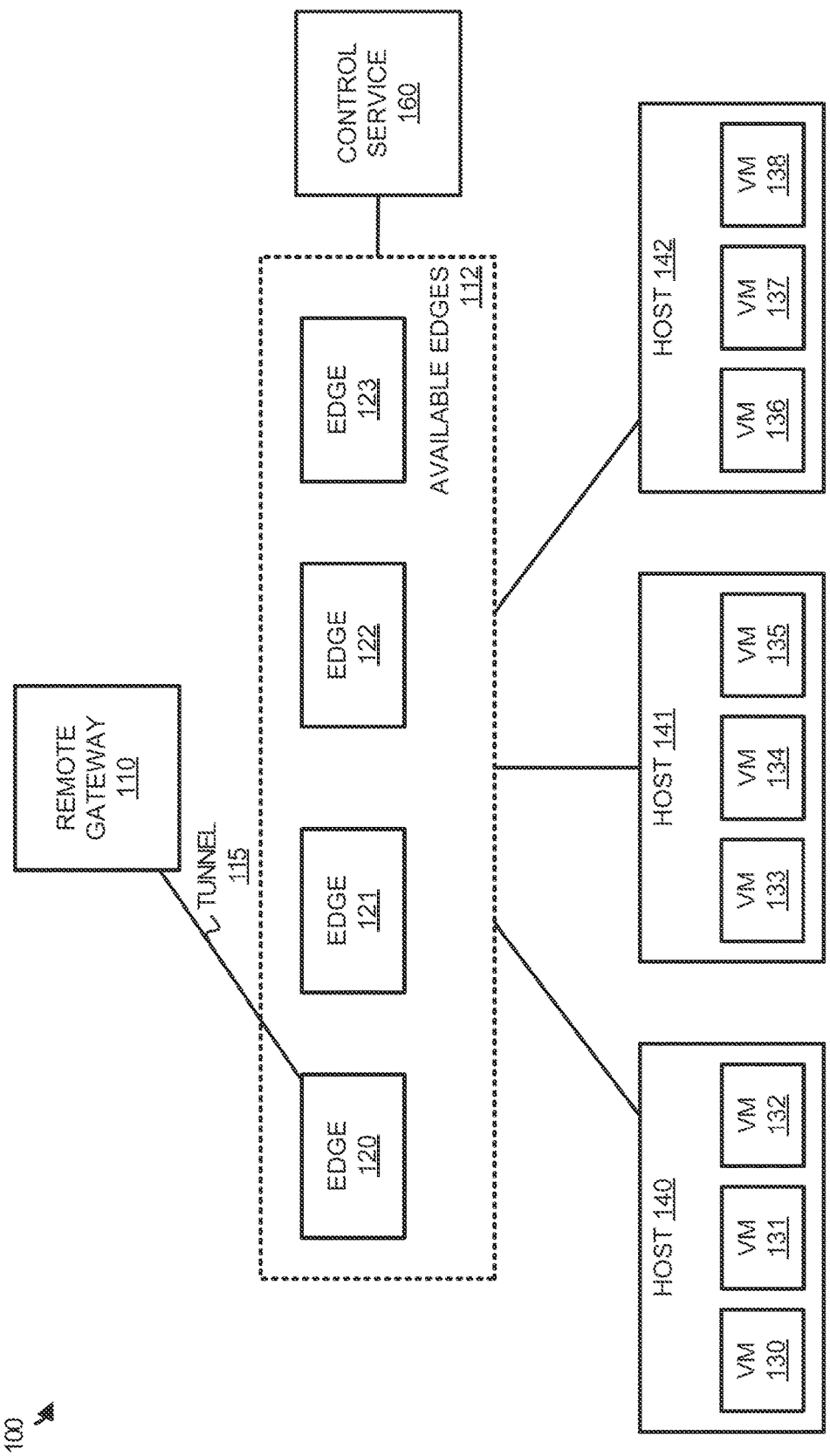
FIG. 1 illustrates a computing environment to manage the exchange of packets between edge gateways to support a private network connection with a remote gateway according to an implementation.

FIG. 1 illustrates a computing environment 100 to manage the exchange of packets between edge gateways to support a private network connection with a remote gateway according to an implementation. Computing environment 100 includes remote gateway 110, available edges 112 with edges 120-123, hosts 140-142, and control service 160. Hosts 140-142 further include virtual machines (VMs) 130-138. Each edge 120-123 may be implemented as a virtual machine, e.g., deployed on one of hosts 140-142, as a set of microservices, or as physical appliances. Edges 120-123 form a cluster that provides load balancing or scale out of gateway services, wherein the services may include routing services, filtering services, firewall services, network address translation services, or some other service. Control service 160 may reside on its own computing system or may be distributed, at least in part, across the computing systems providing the platform for edges 120-123.

As illustrated in computing environment 100, a private network tunnel 115 is established between remote gateway 110 and edge 120. Private network tunnel 115 may comprise an Internet Protocol Security (IPsec) tunnel or some other virtual private network (VPN) tunnel that is carried over one or more physical networks (not shown) and a set of physical devices (not shown) implementing the physical networks, which may include one or more wide area networks such as the Internet. Here, hosts 140-142 are each coupled to edges 120-123 via software defined overlay network connections (not shown) wherein packets can be directed to any one of edges 120-123. As an example, VM 136 may generate a packet that is directed to a computing node (not shown) accessible via remote gateway 110. Once the packet is identified from VM 136, host 140 may identify addressing attributes in the packet and determine a destination edge of edges 120-123 for the packet. In some implementations, the edge may be selected based on a source internet protocol (IP) address in the packet, wherein the source IP may be mapped to an edge of edges 120-123, e.g., using a hash algorithm. In some implementations, the edge may be selected based on a traffic group, wherein IP prefix information associated with the packet may be used to route the packet to a corresponding edge. For example, a source IP address for the packet from VM 136 may be mapped to edge 123 via a source IP prefix in the packet. Once selected, host 140 can encapsulate the packet using Geneve, VXLAN, or some other overlay network encapsulation protocol and forward the packet to the corresponding edge.

Once the encapsulated packet is routed to an edge, the edge may decapsulate the packet and process the addressing of the inner packet to determine whether the packet is required to be forwarded to another edge. In some implementations, each edge of edges 120-123 may maintain routing tables, which indicate how the packets are processed, a next hop for the packets, or some other route operation associated with the packets. In the example of requiring the private network tunnel 115, edge 123 may identify addressing in the decapsulated packet and determine whether the addressing matches any routes that can be processed locally via edge 123. If the only route indicates that the packet should be forwarded to edge 120, edge 123 may re-encapsulate the packet and forward the packet to the "default" edge 120, i.e., the edge providing private network tunnel 115.

After the packet is received at edge 120, edge 120 decapsulates the packet and processes the packet to determine a route for the packet. Edge 120 may perform firewall rules, encapsulation or encryption, or some other operation on the packet. In at least one implementation, edge 120 may identify a destination address for the packet and determine that the packet is destined for remote gateway 110 using tunnel 115. Edge 120 may encapsulate the packet in accordance with private network tunnel 115 and forward the packet to remote gateway 110.

In some examples, there may be a hierarchy of gateways wherein edges 120-123 may represent tier-1 (T1) logical routers and the private tunnel may comprise a T1 private connection with remote gateway 110. In other examples, private network tunnel 115 may extend from a tier-0 (T0) logical router, wherein any T1 processing is provided at the first edge, while the T0 processing is reserved for the edge providing the private network tunnel. For packets exiting the local network through tunnel 115, they may first pass through the T1 router which forwards packets to the T0 router, and the reverse for packets entering the local network via tunnel 115. This hierarchical router configuration is described in more detail in U.S. Pat. No. 10,938,788, which was granted on Mar. 2, 2021, and is incorporated herein by reference. Referring to the example of VM 136 communicating with a computing node via remote gateway 110, host 142 may communicate the packet initially to edge 123. Edge 123 may perform the T1 operations on the packet including firewalls, routing, or some other T1 operation. Once performed, edge 123 may determine that edge 120 is required for the T0 operations and forward the packet to edge 120 for T0 processing and forwarding the packet via private network tunnel 115.

In some implementations, the configuration of edges 120-123 may be accomplished using control service 160 (also referred to as a management and/or control plane) that communicates via a management network (not separately shown) with each of edges 120-123 and dictates how packets are processed and forwarded over the edges. Here, control service 160 may identify an edge 120 of edges 120-123 that provides the private network tunnel 115 with the remote gateway 110. In some examples, control service 160 may select the edge and configure the edge for the private network tunnel. The edge may be identified based on resources available at the edge, based on an administrator configuration of the edge, or based on some other factor. In addition to identifying the edge for the private network tunnel, control service 160 may identify addressing attributes associated with packets to be forwarded over the private network tunnel. The addressing attributes may include source and destination internet protocol (IP) addressing or some other addressing attribute for the private network tunnel. The addressing attributes may be obtained at least in part through addressing advertisements from remote gateway to edge 120, may be identified from a configuration provided by an administrator, or some combination thereof.

Once the addressing information is identified, control service 160 may configure edges 120-123, such that packets that include the requisite addressing attributes are forwarded to the selected edge for the private network tunnel. In some implementations, when the private network tunnel comprises an IPsec tunnel, the configuration of the edges may comprise configuring an IPsec redirect action to redirect packets from edges 121-123 to edge 120 when addressing attributes in the packet correspond to the addressing attributes for the private network tunnel. The IPsec redirect action may comprise a routing table or other data structure that routes packets associated with the attributes to selected edge 120.

Figure 7:
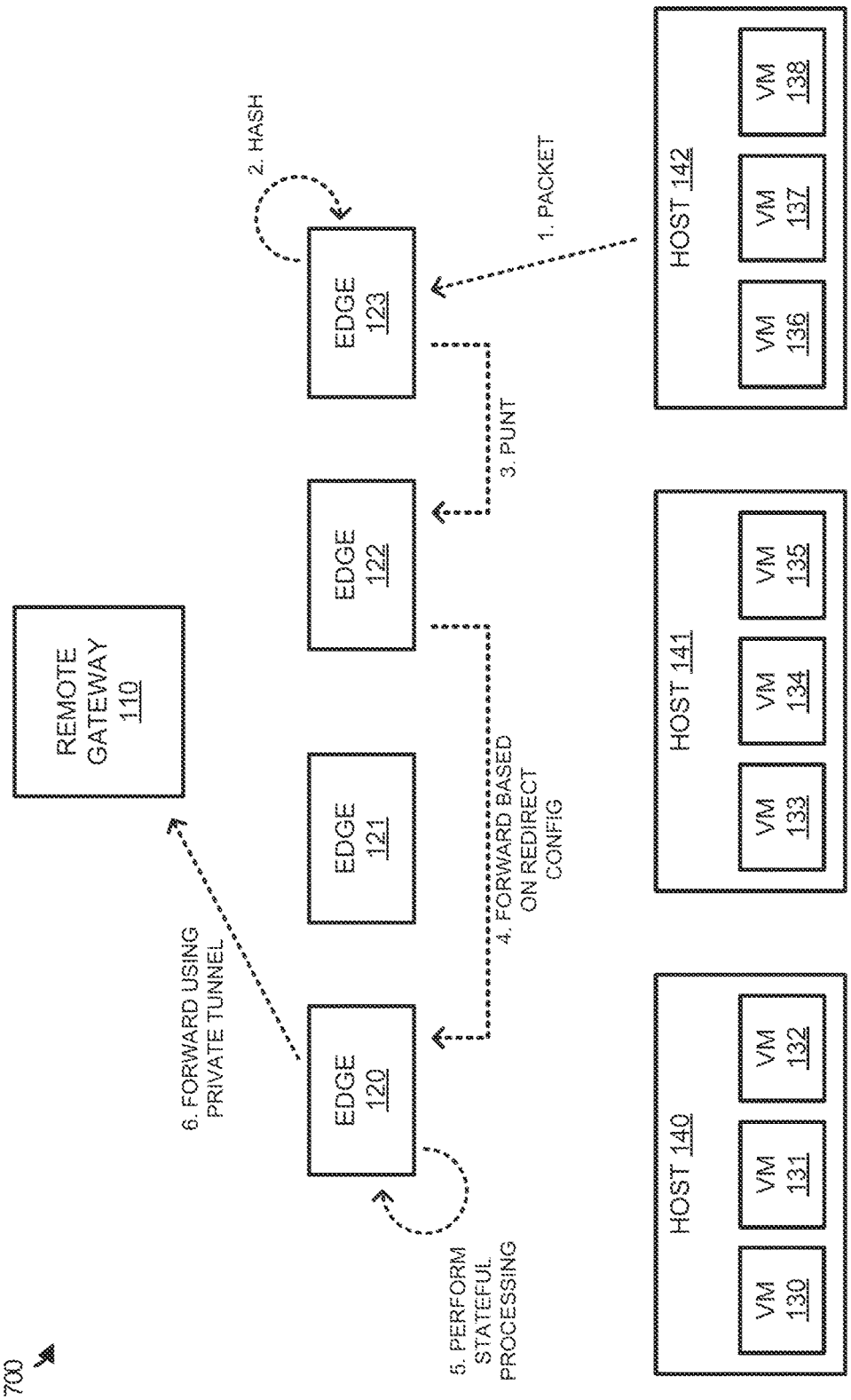
FIG. 7 illustrates an operational scenario of processing a packet received by a plurality of edge gateways according to an implementation.

Although demonstrated in the previous example as each including a single router (i.e., T0 router or T1 router), control service 160 may also configure edges that each include multiple routers (e.g., both a T0 and T1 router as further demonstrated in FIG. 7). As an example, edges 120-123 may each include a T0 and T1 router, and edge 120 may be used as a private network tunnel for the T0 routers. U.S. Patent Application Publication 2021/0314251 describes this configuration in more detail and is incorporated herein by reference. In this configuration, control service 160 may configure edges 120-123 such that a packet is permitted to be processed by a T1 router in one of edges 120-123 and subsequently forwarded to the T0 router of edge 120 for stateful processing in association with the private network tunnel. For example, edge 123 may receive a packet and process the packet in accordance with stateful processing for the T1 router. Once processed, a redirect can be configured to identify addressing attributes in the packet and forward the packet to edge 120 when the addressing attributes satisfy addressing criteria for forwarding to edge 120. Once received at edge 120, edge 120 may perform the T0 stateful processing on the packet and forward the packet using the private network tunnel.

Figure 2:
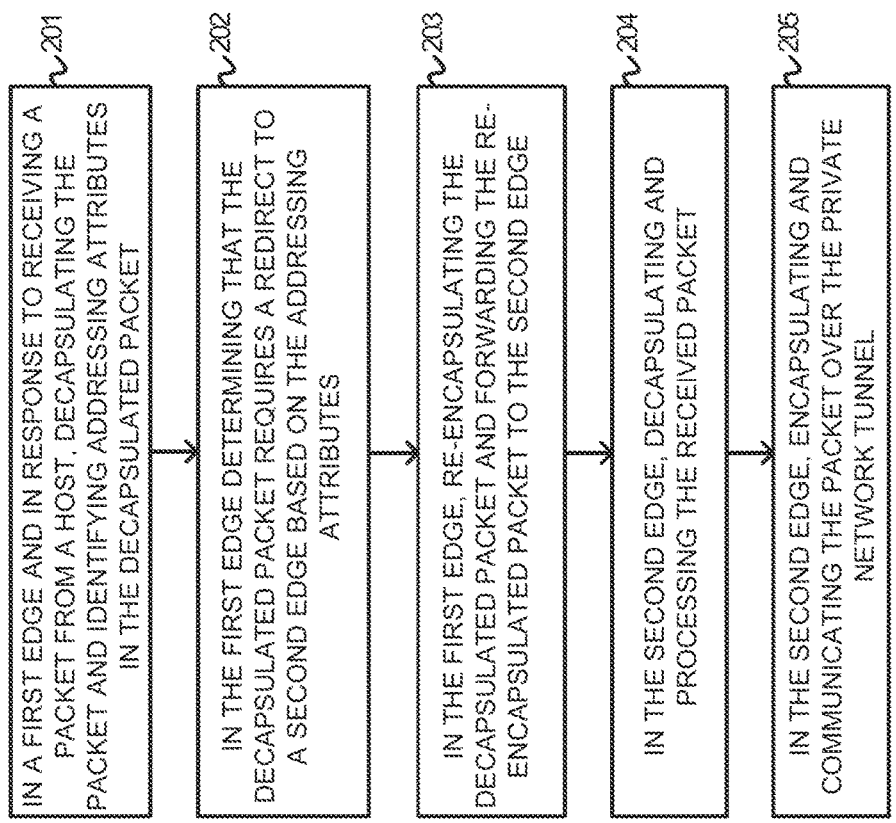
FIG. 2 illustrates a method of operating edge gateways in a computing environment to exchange packets to support a private network connection according to an implementation.

FIG. 2 illustrates a method 200 of operating edge gateways in a computing environment to exchange packets to support a private network connection according to an implementation. The steps of method 200 are referenced parenthetically in the paragraphs that follow with reference to systems and components of computing environment 100 of FIG. 1.

For method 200, a first edge receives a packet from a host in computing environment 100. In the first edge and in response to receiving the packet form the host, the method further includes decapsulating (201) the packet and identifying addressing attributes in the decapsulated packet. In some implementations, hosts 140-142 may identify a packet communicated from one of VMs 130-138. In response to identifying the packet, the host may identify addressing information for the packet to select an edge of edges 120-123. In at least one implementation, hosts 140-142 may maintain traffic group information that forwards packets to edges based on the source IP prefixes in the packet. For example, host 142 may identify a packet from VM 136 and identify at least a source IP address in the packet. Based on the source IP address host 140 may select an edge of edges 120-123, encapsulate the packet, and forward the packet to the selected edge. This traffic group configuration may be supplied by control service 160, wherein packets with specific addressing attributes (e.g., source IP address or prefix) will be forwarded to an edge associated with the addressing attributes. By configuring traffic groups, control service 160 may eliminate punting between by permitting the hosts to identify the correct edge associated with the stateful processing for the packet, including firewalls, filtering, and the like. Additionally, using traffic groups, load balancing may be achieved by communicating packets with different attributes to different edges.

Method 200 further includes, in the first edge, determining (202) that the decapsulated packet is required to be forwarded to a second edge based on the addressing attributes in the decapsulated packet. For example, a host may communicate an encapsulated packet to edge 123 and edge 123 may process addressing in the packet to identify that the route requires a redirect to edge 120. If the packet did not require the redirect to edge 120, then edge 123 may process the packet and forward the packet to another gateway or computing endpoint. The forwarding may be done with or without encapsulation in some examples when the private network tunnel is not required. In some implementations, in determining whether the decapsulated packet should be redirected to edge 120, control service 160 may supply a redirect configuration to at least edges 121-123 that can direct packets with addressing attributes associated with the private network tunnel to edge 120. This configuration may comprise a routing table or other data structure that is applied to the decapsulated packet to determine whether the packet should be redirected prior to performing stateful processing. The addressing information may correspond to source and destination IP addresses for packets to be communicated over the private network tunnel, wherein the addressing information may be learned from advertising by gateways and hosts, a configuration from an administrator, or some combination thereof.

When the private network tunnel is required or a redirect is detected to edge 120, method 200 provides, in the first edge, re-encapsulating (203) the decapsulated packet and forwarding the re-encapsulated packet to the second edge. In re-encapsulating the packet, the first edge may use GENEVE, VXLAN, or some other encapsulation protocol. The encapsulated packet may use a destination IP address for the second edge to direct packets to the destination edge. After communicating the packet, method 200 includes, in the second edge, receiving the encapsulated packet from the first edge, decapsulating (204) the encapsulated packet, and processing the packet in accordance with stateful, and in some examples non-stateful, services, which can include firewall services, filtering, and the like.

After processing the packet, method 200 also provides, in the second edge, encapsulating (205) and communicating the packet in accordance with the private network tunnel to a gateway. The encapsulation may comprise IPsec encapsulation or some other secure encapsulation. In some implementations, the second edge may maintain one or more data structure that indicate routes based on destination addresses, including an indication of secure tunnels that are to be used in association with the communications.

Although demonstrated as an egress packet from a host 140 to a remote gateway 110, edge 120 may further receive packets from remote gateway 110. In response to receiving a packet, which can be encapsulated in an IPsec header or other private network protocol header, edge 120 may perform stateful operations on the packet. Once performed edge 120 may determine where to forward the packet. In some implementations, edge 120 may forward the packet directly to a destination host, however, edge 120 may redirect packets in some examples to one of edges 121-123 based on addressing information in the packet. Like the redirect actions that forward packets from edges 121-123 to edge 120 based on addressing attributes, edge 120 may be configured to redirect packets with addressing attributes to edges 121-123 based on addressing attributes. Edges 121-123 may then forward the packets to the requisite host without performing stateful processing as it was implemented by edge 120.

In some implementations, edges 120-123 may provide failover operations for other edges in the cluster. For example, edges 120-121 may comprise a first failover pair, while edges 122-123 may provide a second failover pair. To provide the failover operations, edges within a pair may exchange state information, wherein the state information may comprise firewall state information, flow information, or some other state information. The edges may further exchange information about IP addresses allocated to each of the edges, such that the other edge in the pair may take over in the event of a failure. When a failure occurs for an edge, the other edge in the pair may assume the operations of the failed edge. For example, if edge 120 were to fail, either due to a software or hardware issue, edge 121 may assume the operations of edge 120 using the state information provided from edge 120. Edge 121 may also assume the IP addresses that were used to address edge 120 and advertise the addresses to hosts and gateways, such that packets are directed to edge 121 in place of edge 120. Edge 121 may also monitor for when edge 120 returns to being available, communicate state information to edge 120 when the edge becomes available, and permit edge 120 to assume the IP addresses that were surrendered to edge 121.

In some implementations, the edge pairs may each be active during the same period. For example, edges 120-121 may be active and provide different routing operations for packets with different attributes. In other implementations, the edge pairs may be configured such that a first edge is active while the second edge is in standby. As an example, edge 120 may be active and edge 121 may be in standby. If edge 120 were to fail, the operations of edge 120 may be transferred to edge 121 using the state information and permitting edge 121 to assume the addressing of edge 120. Thus, packets may be directed to edge 121 in place of edge 120 during a failure period for edge 120.

Figure 3:
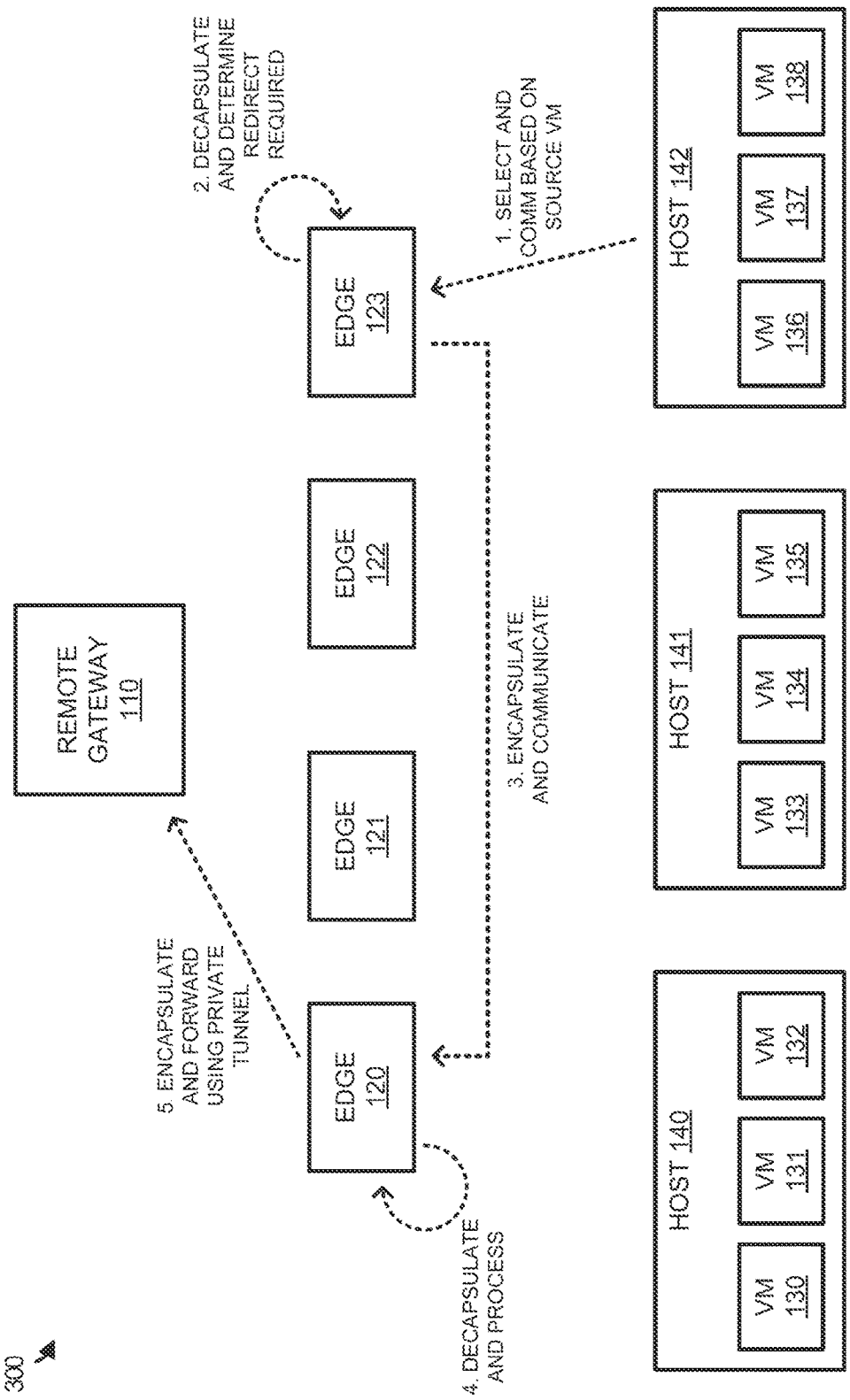
FIG. 3 illustrates an operational scenario of managing the exchange of packets between edge gateways to support a private network connection according to an implementation.

FIG. 3 illustrates an operational scenario 300 of managing the exchange of packets between edge gateways to support a private network connection according to an implementation. Operational scenario 300 includes systems and components from computing environment 100 of FIG. 1. The example of FIG. 3 demonstrates when hosts are configured with traffic groups by control service 160, and FIG. 7 demonstrates when hosts are not configured with traffic groups by control service 160.

As depicted, host 142 selects, at step 1, an edge from edges 120-123 to forward a packet from a VM of VMs 136-138. In selecting edge 123, host 142 may process addressing attributes of the packet and identify a route that corresponds to the addressing attributes. In at least one example, host 142 may identify a prefix associated with the source IP address and identify an edge corresponding to the prefix. Once identified, the packet is encapsulated and forwarded to edge 123. After receiving the encapsulated packet, edge 123 decapsulates the packet, at step 2, and determines the route requires a redirect to edge 120. In some examples, edges 120-123 may be provided with routes by control service 160 (not pictured) that define how packets should be forwarded. The routes may indicate whether a packet should be permitted or blocked, encapsulation requirements for the packet, or some other information associated with routing the packet. In at least one example, the control service may identify the edge that is supporting the private network tunnel and identify addressing attributes for packets that are required to be communicated over the private network tunnel. The addressing attributes may comprise source IP addresses, destination IP addresses, or some other addressing information. In some examples, the addressing attributes may be configured by an administrator, learned from edges, gateways, and hosts, or identified in some combination thereof. For example, the addressing attributes may indicate that packets with a source IP address associated with VM 138 and a destination IP address behind remote gateway 110 should be redirected to edge 120. Once the addressing attributes are identified for redirection, edges 121-123 may be configured to redirect received packets to edge 120 by comparing attributes in the packet to the addressing attributes supplied by the control service. This comparison may include routing tables in some examples, wherein the addressing information from the packet is compared to entries in the routing tables.

After a redirect is identified for the packet to edge 120, edge 123 encapsulates, at step 3, the packet and communicates the packet to edge 120. Once received, edge 120 decapsulates the packet and processes the packet, at step 4, to determine routing rules for the packet. The processing of the packet may include applying one or more firewall rules, identifying a route match for the packet, or some other stateful or non-stateful process. In some implementations, edge 120 may process the addressing information of the packet to identify a routing path for the packet. The addressing information may include at least the destination IP address, but may further include the source IP address, port information, or some other addressing attribute. Once a route match is identified for the packet, edge 120 may encapsulate the packet and forward the packet, at step 5, to remote gateway 110. The encapsulation may comprise IPsec encapsulation in some examples that is used to provide an encrypted connection between gateways.

Figure 4:
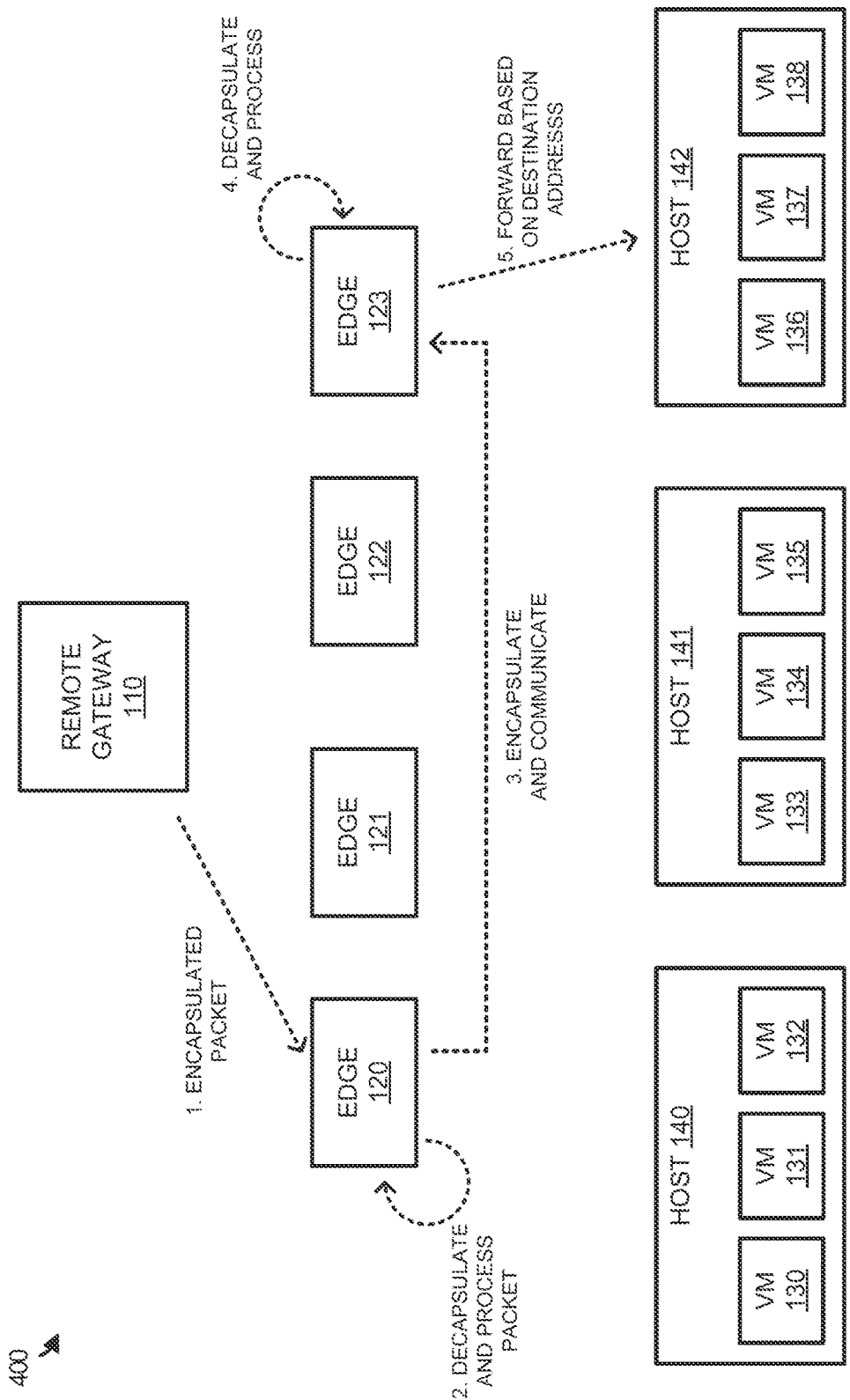
FIG. 4 illustrates an operational scenario of managing the exchange of packets between edge gateways to support private a network connection according to an implementation.

FIG. 4 illustrates an operational scenario 400 of managing the exchange of packets between edge gateways to support private a network connection according to an implementation. Operational scenario 400 includes systems and components of computing environment 100 of FIG. 1.

In operational scenario 400, remote gateway 110 communicates, at step 1, an encapsulated packet to edge 120, wherein the encapsulated packet may comprise an IPsec packet in some examples. In response to receiving the encrypted packet, edge 120 will decapsulate, at step 2, the packet and process the packet to determine routing rules for the decapsulated packet. In some implementations, edge 120 may identify a destination IP address for the packet, but may also identify the source IP address, ports, or other addressing attributes in the packet to determine the routing rules. The processing at edge 120 may include applying one or more firewall rules, applying filtering to the packet, or some other stateful or non-stateful process associated with the packet. Once processed, edge 120 can determine where to forward the packet based on addressing attributes in the packet. In some implementations, control service 160 (not pictured) can configure edge 120 for forwarding packets. In some implementations, edge 120 may forward the packet directly to the destination host or may forward the packet to another edge, such as edge 123 in the present example.

In response to identifying edge 123, edge 120 may encapsulate the packet and forward the packet to edge 123, at step 3. Edge 123 may decapsulate the packet upon receipt at step 4 and determine a route for the packet using addressing attributes from the decapsulated packet. For example, if the packet included a destination IP address associated with VM 136, the packet may be encapsulated and forwarded to host 140, wherein host 140 may be used to provide the packet to the virtual network interface associated with VM 136. In some implementations, edge 120 is used to provide the stateful operations associated with the packet, and edge 123 acts as a forwarding point to the destination host without applying stateful processes on the packet. The redirect from edge 120 to edge 123 may be used to preserve a path defined by traffic groups that direct traffic for the packet from host 142 to edge 123.

Although demonstrated as communicating a packet between edges, edge 120 may communicate directly with a host in some implementations. For example, when an encapsulated packet is received at edge 120, the packet can be decapsulated to identify addressing attributes of the packet. From the addressing attributes, edge 120 may identify that the packet should be routed directly to a host of hosts 140-142. Once the host is identified, the packet can be re-encapsulated and forwarded to the corresponding host.

Figure 5:
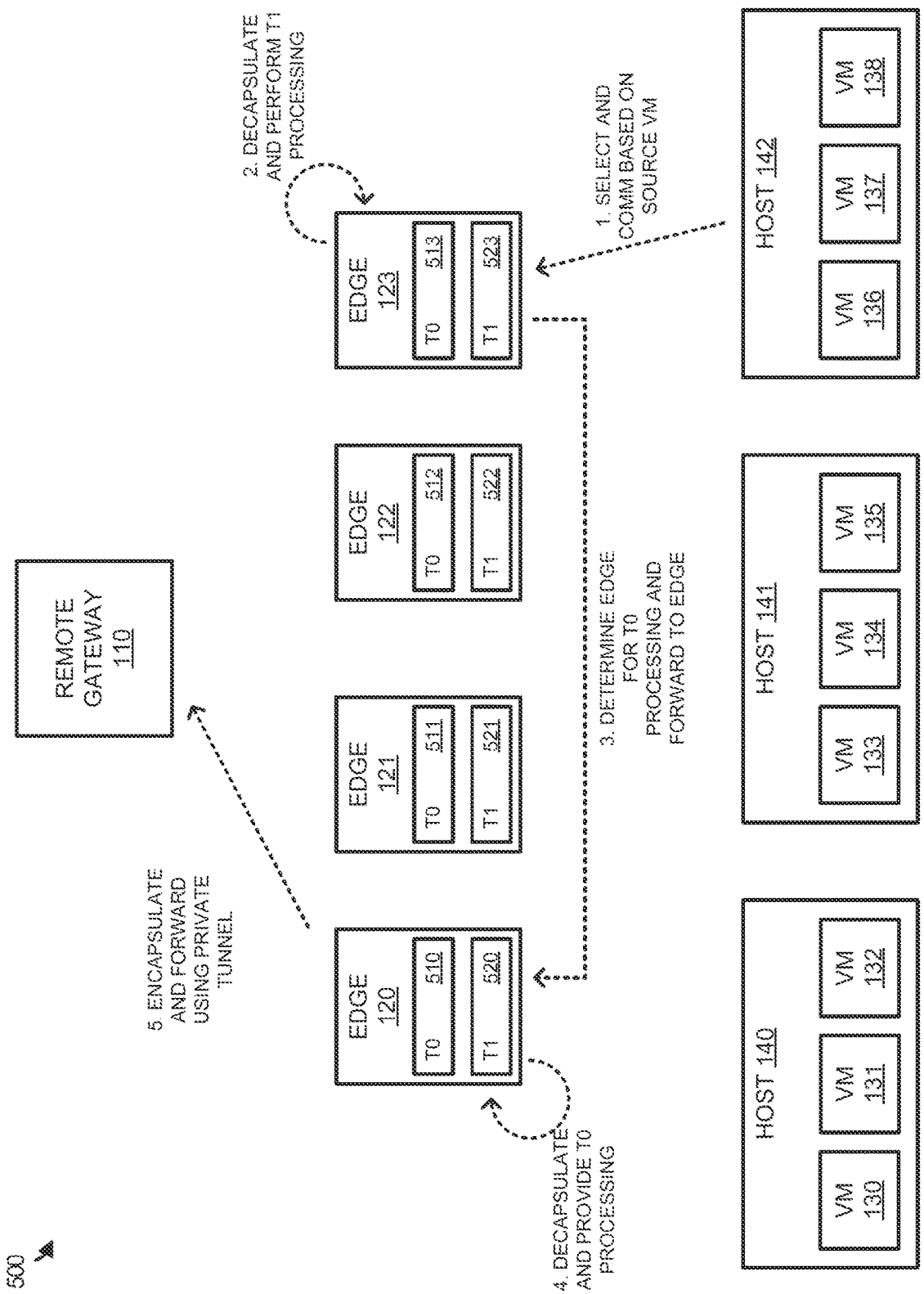
FIG. 5 illustrates an operational scenario of managing the exchange of packets between edge gateways to support a private network connection according to an implementation.

FIG. 5 illustrates an operational scenario 500 of managing the exchange of packets between edge gateways to support a private network connection according to an implementation. Operational scenario 500 includes systems and components from computing environment 100 of FIG. 1. Operational scenario 500 further includes T0 logical routers 510-513 and T1 logical routers 520-523.

In operational scenario 500, host 142 selects, at step 1, a destination edge from edge 120-123 and forwards an encapsulated packet to edge 123. In selecting edge 123 for the packet, host 142 may identify addressing information in the packet from the virtual machine, including a source IP address for the packet. The addressing information may be applied to rules maintained by host 142 to select the edge from edges 120-123. In at least one example, the prefix of the source IP address can be identified to select the edge of edges 120-123. After the packet is received by edge 123, edge 123 may decapsulate the packet and perform T1 logical routing processing on the packet at step 2, wherein the processing may include firewall operations, route selection, network address translation, or some other operation.

Once the T1 logical routing is performed, edge 123 may identify an edge from edges 120-123 to perform the T0 logical routing processing for the packet. In at least one example, edge 123 may identify a destination IP address or some other addressing attribute for the packet and identify the routing requires the packet to be forwarded to edge 120 at step 3. In some implementations, the control service (not pictured) may define a redirect action or IPsec redirect action that can direct packets associated with a private network tunnel toward the edge with the logical router supporting the private network tunnel (edge 120 with T0 logical router 510). In configuring edges 121-123, the control service may provide addressing attributes that can be compared to attributes in a packet to determine whether the packet should be redirected. Thus, after completing the T1 processing in T1 logical router 523, the redirect action may be applied to the addressing and forwarded to edge 120 in accordance with the redirect action.

In response to receiving the packet, edge 120 may decapsulate the packet and process the packet in accordance with T0 routing policies maintained by edge 120 at step 4. The T0 processing may include applying firewall rules, identifying a routing policy associated with addressing of the packet, applying one or more filters to the packet, or providing some other operation in association with the packet.

Here, the addressing of the packet is used to direct the packet to remote gateway 110. Once remote gateway 110 is identified for the route, edge 120 will encapsulate, at step 5, and forward the packet using the private network tunnel established between remote gateway 110 and edge 120. The private network tunnel may comprise an IPsec tunnel in some examples, wherein remote gateway may correspond to another datacenter or computing location for an organization.

In some implementations, each host of hosts 140-142 may be configured by the control service with traffic policies that can be used to direct packets to edges that will support the stateful processing of the packets. For example, when the packet is communicated by a VM on host 142, host 142 may be configured by the control service to direct the packet to edge 123 to support the processing of the application. In other implementations, the control service may be incapable or not configured to provide traffic policies to hosts 140-142. In these examples, each host may perform ECMP to select an edge 120-123 to direct a packet. When an edge receives a packet, the edge may perform a hash on the addressing of the packet to direct the packet to the appropriate edge of edges 120-123 to maintain stateful processing associated with the packet. This hash may direct the packet to stay at the same edge (i.e., the same T1 logical router) or may direct the packet to be punted to another edge.

In some implementations, edges 120-123 may provide failover operations for another edge in the cluster. For example, edges 120-121 may represent a first pair capable of providing failover operations for one another, while edges 122-123 may represent a second pair capable of providing failover operations for one another. To provide the failover operations the pairs may exchange state information, wherein the state information may include IPsec session information, firewall status information, or some other state information. When a failure occurs, the other edge in the pair may assume the responsibilities of the failed edge. For example, if edge 120 encounters a failure, which may occur due to a software error, hardware failure, or some other failure, edge 121 may assume the responsibilities of edge 120. In some examples, in assuming the responsibilities of edge 120, edge 121 may assume one or more IP addresses allocated to edge 120, such that packets will be directed to edge 121 in place of edge 120. In some implementations, edge 121 may further monitor the health of edge 120 and permit edge 120 to reassume its role upon becoming available. This may include providing edge 120 with the state information from edge 121 and reassigning the IP address or addresses to edge 120. Thus, packets may be directed to edge 120 in place of edge 121.

Figure 6:
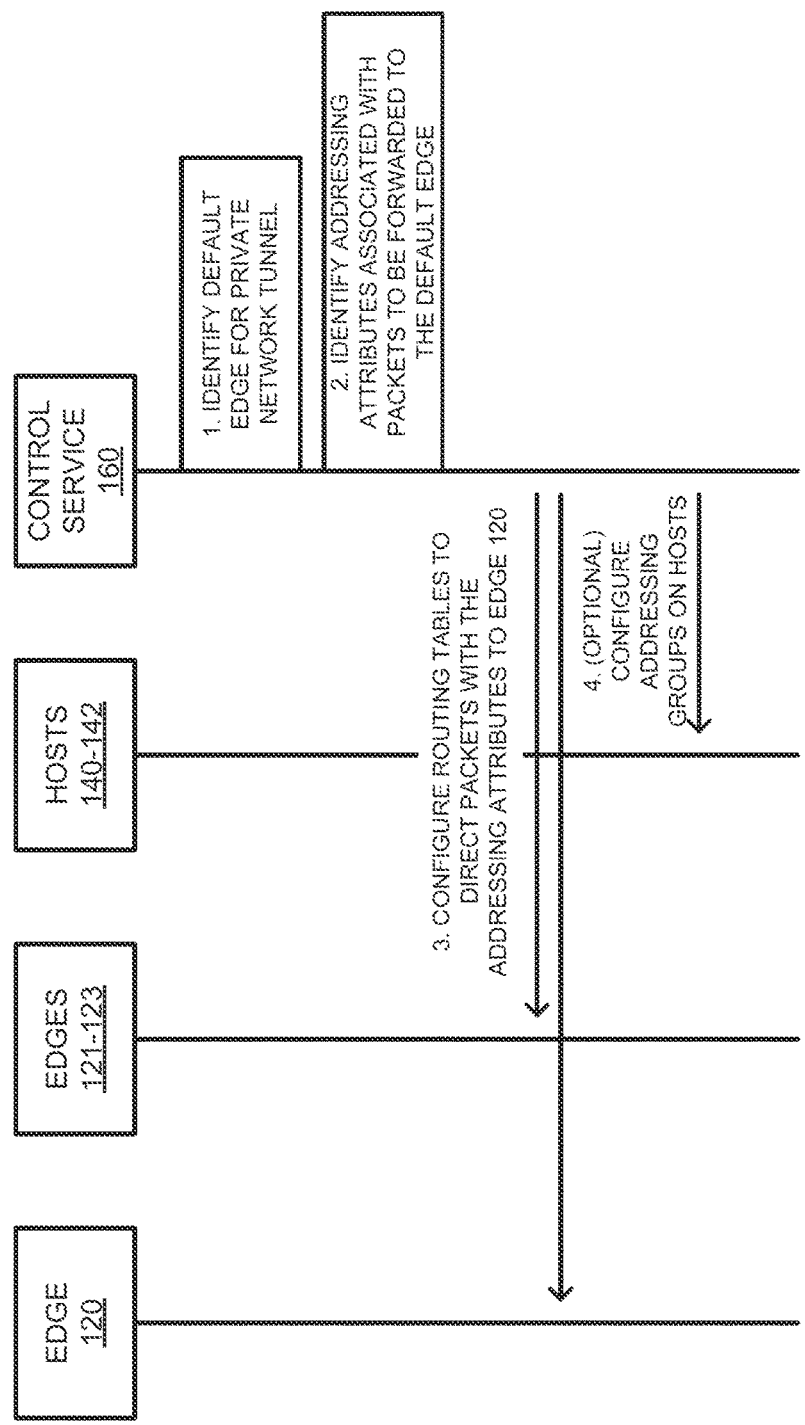
FIG. 6 illustrates a timing diagram for configuring a plurality of edge gateways to communicate packets over a private network tunnel according to an implementation.

FIG. 6 illustrates a timing diagram 600 for configuring a plurality of edge gateways to communicate packets over a private network tunnel according to an implementation. Timing diagram 600 includes edges 120-123, hosts 140-142, and control service 160. Control service 160 may be implemented on one or more separate computing systems from edges 120-123 or may be implemented at least partially on one or more computing systems providing a platform for edges 120-123.

In timing diagram 600, control service 160 identifies, at step 1, a default edge for a private network tunnel from a plurality of available edges. The identification of the default edge may be based on an administrator selection, based on resources available at the edge, random selection, or identified by some other operation. Once the default edge is identified for the private network tunnel, control service 160 further identifies addressing attributes associated with packets to be forwarded to the default edge at step 2. The addressing attributes may include source and destination IP addresses or some other addressing information that corresponds to the private network tunnel.

After identifying the addressing attributes, control service 160 further configures, at step 3, routing tables of edges 120-123 to direct packets with the addressing attributes to edge 120. Specifically, as edge 120 is identified as the edge for the private network tunnel endpoint, edges 121-123 may be configured with a redirect action (IPsec redirect action for an IPsec tunnel) that redirects packets with the addressing attributes to edge 120. In some implementations, control service 160 may further configure edge 120 with the required stateful services, such as firewalls, routing information, and the like to provide the endpoint for the private network tunnel.

Once edges 120-123 are configured to redirect packets with the addressing attributes to edge 120, a packet can be received at one of edges 121-123 and processed to determine whether the packet includes addressing attributes that qualify for the packet to be forwarded to edge 120 based on a comparison of the attributes of the packet and the identified addressing attributes for the private network tunnel. If the packet includes the requisite addressing attributes, the packet will be forwarded to the edge 120 for stateful processing and encapsulation for the private network tunnel. If the packet does not include the requisite addressing attributes, then the stateful processing can be performed locally at the current edge. For example, a packet received at edge 123 can be processed to determine whether addressing attributes in the packet qualify the packet to be forwarded to edge 120 based on a comparison of the addressing attributes with the addressing attributes provided as part of the redirect configuration from control service 160. When the addressing attributes qualify for the redirect, the packet is forwarded to edge 120, otherwise the packet can be processed locally at edge 123.

In some implementations, hosts 140-142 are not configured to select an edge of edges 120-123 to provide stateful processing on the packets. Rather, each host of hosts 140-142 may be configured with an equal-cost multi-path (ECMP) configuration that can select an edge from edges 120-123 using hashing, random selection, or some other mechanism. For example, a packet from host 140 may initially be directed to edge 123 based on the ECMP configuration of the host. To implement the stateful processing, edge 123 may hash addressing information in the packet, such as the source IP address, to select an appropriate edge for the stateful processing. For example, edge 123 may hash the source IP address to select edge 122 for the stateful processing of the packet and may forward the packet to edge 122. Once received at edge 122, edge 122 may determine whether the addressing information in the packet qualifies for a redirect to edge 120, wherein edge 120 provides the stateful operations associated with the private network tunnel. When the addressing information qualifies, edge 122 will forward the packet to edge 120, permitting edge 120 to provide the required stateful operations.

In other implementations, control service 160 may configure, at step 4, traffic groups on hosts 140-142, permitting the hosts 140-142 to communicate packets to a desired host for stateful processing. Specifically, the traffic groups may permit a host to identify an egress packet, identify source addressing in the packet, and forward the packet to an edge of edges 120-123. Advantageously, when the traffic groups are configured, punting is not required between edges to provide the stateful processing. For example, host 142 may identify an egress packet and select an edge of edges 120-123 as a destination of the packet, such as edge 123. Once received, edge 123 may determine whether the packet should be redirected to edge 120 based on the addressing attributes in the packet, wherein the determination will occur prior to stateful processing on the packet. Once determined that the packet should be redirected, the packet can be forwarded to edge 120 for stateful processing and forwarding via the private network tunnel.

Although not described in the previous examples, the communications between hosts 140-142 and edges 120-123 may use encapsulation such as Geneve. For example, a packet from host 142 may be encapsulated as it is forwarded to edge 123 and edge 123 may re-encapsulate the packet prior to forwarding the packet to edge 120 for stateful processing.

FIG. 7 illustrates an operational scenario 700 of processing a packet received by a plurality of edge gateways according to an implementation. Operational scenario 700 includes remote gateway 110, edges 120-123, and hosts 140-142 with virtual machines 130-138 from FIG. 1. Operational scenario 700 is an example when control service 160 (not pictured for clarity) does not configure hosts 140-142 with traffic groups to forward packets to specific edges for stateful processing.

In operational scenario 700, host 142 communicates, at step 1, a packet to edge 123, wherein the edge may be selected using a form of ECMP, including random selection, load balancing, or some other mechanism. Once the packet is received at edge 123, edge 123 may perform a hash, at step 2, to select an edge for stateful processing, which is considered punting between edges to preserve the stateful processing of packets. In some examples, edge 123 may hash the source IP address of the packet, however, other addressing attributes can be hashed in some examples.

Here, the hash at edge 123, indicates the packet should be forwarded or punted, at step 3, to edge 122. Once received at edge 122, edge 122 may identify addressing information in the packet and determine whether the packet qualifies for a redirect to edge 120. Specifically, edges 121-123 can be configured by control service 160 (not pictured) to forward packets with specific attributes to edge 120. The control service may identify an edge of edges 120-123 to support the private network tunnel and may redirect traffic associated with the private network tunnel to edge 120. As a result, rather than the stateful processes being performed at edges 121-123 (e.g., firewall processes), the packet can be forwarded to edge 120 to perform the required stateful processing. In the example of operational scenario 700, edge 122 determines that the packet should be forwarded to edge 120 based on the redirect configuration from the control service at step 4. In response to receiving the packet, edge 120 performs the stateful processing on the packet, which may include firewall processes, filtering processes, or some other processing of the packet. Edge 120 can then forward, at step 6, the packet using the private network tunnel.

Although not demonstrated in the example of operational scenario 700, the communications from host 142 to edge 123 and the communications between the different edges may encapsulate the packet using Geneve or some other encapsulation protocol. Further, while demonstrated as punting packets between edges and redirecting packets based on addressing information in the packets, punting, or redirecting may not be required for some packets. For example, if the packet in operational scenario 700 were initially communicated to edge 120, edge 122 would not be required to punt or redirect the packet for the stateful processing.

Further, while not demonstrated in operational scenario 700, each edge of edges 120-123 may support a T0 and a T1 logical router. For example, edge 122 may provide T1 logical routing processes on a packet. After providing the T1 logical routing processes, edge 122 may determine whether addressing in the packet applies to a redirect action to another edge, wherein the redirect action can be used to direct packets to an edge and T1 router supporting a private network tunnel. If the addressing attributes qualify, based on a configuration provided form the control service, the packet can be forwarded or redirected to edge 120 that can provide stateful services in accordance with a T0 logical router and the private network tunnel.

Figure 8:
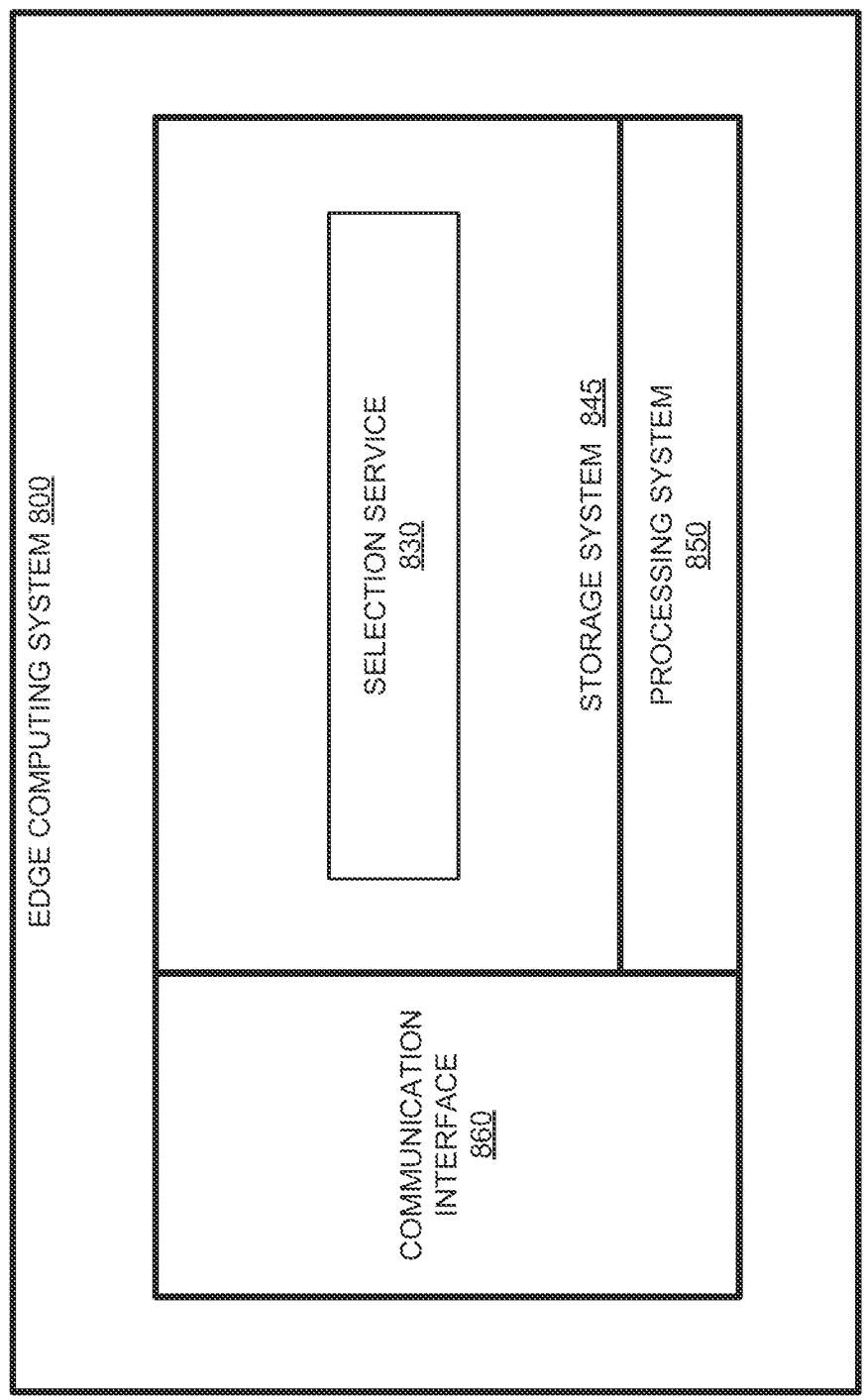
FIG. 8 illustrates an edge computing system to manage the exchange of packets to support a private network connection according to an implementation.

FIG. 8 illustrates an edge computing system 800 to manage the exchange of packets to support a private network connection according to an implementation. Computing system 800 is representative of any computing system or systems with which the various operational architectures, processes, scenarios, and sequences disclosed herein for an edge gateway can be implemented. Computing system 800 is an example of edges 120-123 of FIG. 1, although other examples may exist. Computing system 800 includes storage system 845, processing system 850, and communication interface 860. Processing system 850 is operatively linked to communication interface 860 and storage system 845. Communication interface 860 may be communicatively linked to storage system 845 in some implementations. Computing system 800 may further include other components such as a battery and enclosure that are not shown for clarity.

Communication interface 860 comprises components that communicate over communication links, such as network cards, ports, radio frequency (RF), processing circuitry and software, or some other communication devices. Communication interface 860 may be configured to communicate over metallic, wireless, or optical links. Communication interface 860 may be configured to use Time Division Multiplex (TDM), Internet Protocol (IP), Ethernet, optical networking, wireless protocols, communication signaling, or some other communication format—including combinations thereof. Communication interface 860 is configured to communicate with host computing systems and gateways.

Processing system 850 comprises microprocessor and other circuitry that retrieves and executes operating software from storage system 845. Storage system 845 may include volatile and nonvolatile, removable and non-removable media implemented in any method or technology for storage of information, such as computer readable instructions, data structures, program modules, or other data. Storage system 845 may be implemented as a single storage device but may also be implemented across multiple storage devices or sub-systems. Storage system 845 may comprise additional components, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 850 is typically mounted on a circuit board that may also hold the storage system. The operating software of storage system 845 comprises computer programs, firmware, or some other form of machine-readable program instructions. The operating software of storage system 845 comprises selection service 830 that provides at least method 200 of FIG. 2. The operating software on storage system 845 may further include an operating system, utilities, drivers, network interfaces, applications, or some other type of software. When read and executed by processing system 850 the operating software on storage system 845 directs computing system 800 to operate as described herein.

In at least one implementation, selection service 830 directs processing system 850 to receive an encapsulated packet from a host computing system. In response to receiving the packet, selection service 830 directs processing system 850 to decapsulate the packet and identify addressing attributes in the decapsulated packet. In at least one example, selection service 830 may identify a destination IP address for the packet and compare the destination IP address to routes available to be processed by edge computing system 800. If no route exists or the only route is through another edge providing a private network tunnel for the packet, selection service 830 re-encapsulates the packet and forwards the packet toward the destination edge.

In at least one example, a computing environment may employ a cluster of edges, wherein a first edge in the cluster may provide a private network tunnel and the remaining edges may forward packets to the first edge to communicate the packets over the private network tunnel. In some examples, the first edge may advertise one or more addresses accessible via the private network tunnel to the other edges in the cluster. In other examples, the first edge may comprise a default gateway, wherein edges may identify that no other routes exist for the destination IP address and may forward the packet to the default first edge to support the packet. After being received, the edge may decrypt the packet, provide any processing on the packet, and forward the packet to a destination gateway.

Although demonstrated in the previous example as forwarding the packet from computing system 800 to another edge to support the forwarding of the packet via a private network tunnel, computing system 800 may be configured to support the private network tunnel for the cluster in some examples. As a result, when an encapsulated packet is received from a host or another edge in the cluster, selections service 830 may direct processing system 850 to decapsulate the packet, identify routing policies associated with the packet, and forward the packet based on the routing policies. If the addressing attributes of the packet indicate that the private network tunnel is required, the packet can be encapsulated in accordance with the private network tunnel and forwarded to the remote gateway.

In some examples, edges may provide both T1 logical routers and T0 logical routers, wherein different policies may be implemented at each tier of the T1 and T0. For example, multiple tenants of a computing environment may each be associated with a different T1 logical router, wherein virtual computing nodes, such as virtual machines or containers can be coupled to the corresponding T1 logical router. The T1 routers for each of the tenants may then be logically coupled to one or more T0 logical routers that can be used to provide different operations of the routers. Each of the routers may perform network address translation, encapsulation, firewall operations, or some other operation in association with the packets. For example, a packet from a virtual machine may be forwarded to a T1 logical router at a first edge for processing. Once the T1 logical router performs its operations at the first gateway, a T0 selection may be made based on addressing attributes of the packet.

In at least one example, the first edge may select an edge for the T0 processing based on addressing attributes associated with the packet. Once the T0 is selected, the packet can be encapsulated, forwarded, and processed by the selected edge. In some implementations, the edge that provides the T1 processing may also provide the T0 processing, which eliminates the requirement that the packet be exchanged from one edge to another. For example, if edge computing system 800 was configured to provide both T1 and T0 logical routing for a received packet from a host, edge computing system may process the packet using policies associated with both the T1 and T0 logical routers, encapsulate the packet for communication over the private network tunnel, and forward the packet to the remote gateway. Thus, the packet can be forwarded to the remote gateway without exchanging the packet with other edges.

Figure 9:
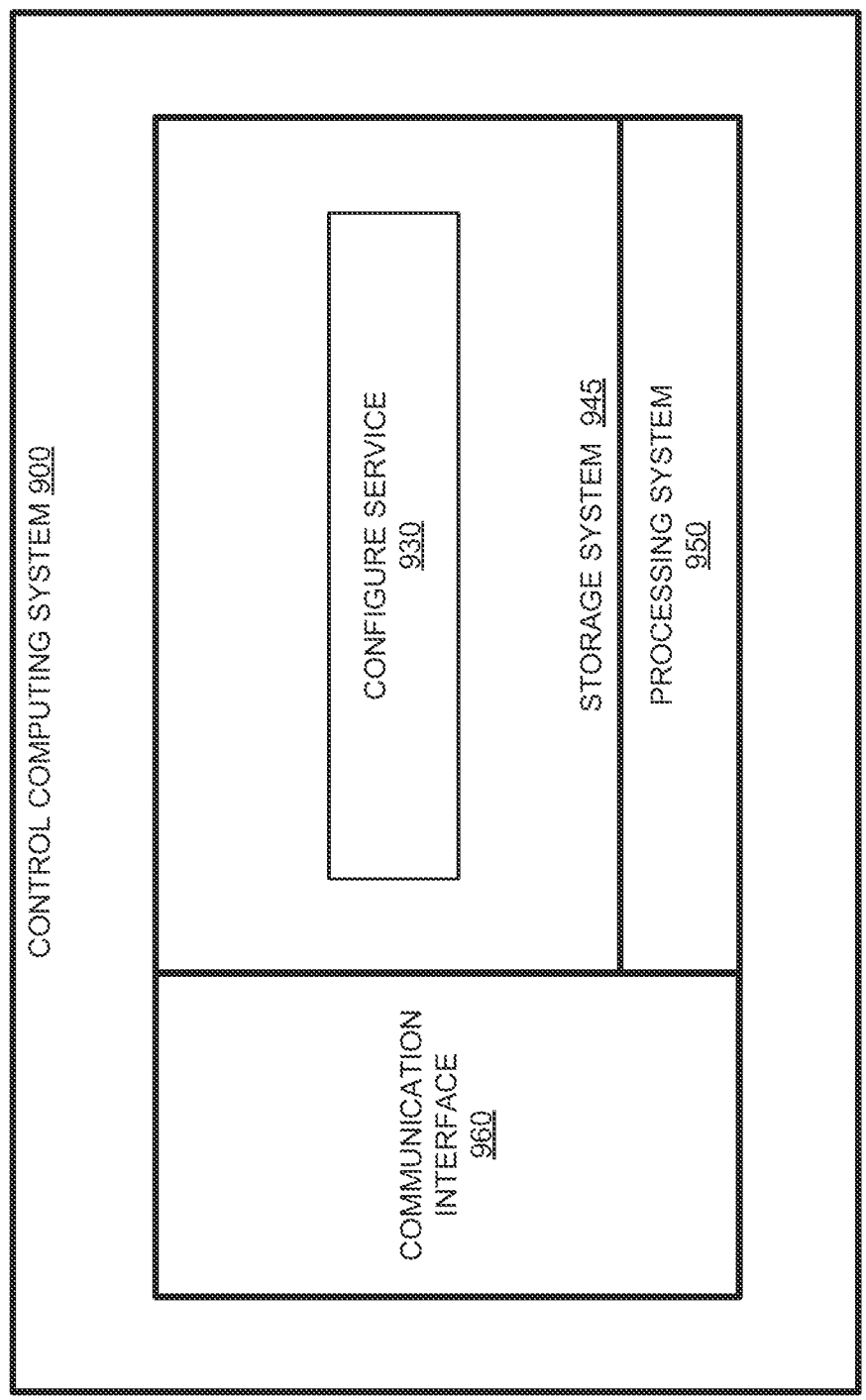
FIG. 9 illustrates a control computing system to configure edge gateways in a computing environment according to an implementation.

FIG. 9 illustrates a control computing system 900 to configure edge gateways in a computing environment according to an implementation. Computing system 900 is representative of any computing system or systems with which the various operational architectures, processes, scenarios, and sequences disclosed herein for control service can be implemented. Computing system 900 is an example of control service 190 of FIG. 1, although other examples may exist. Computing system 900 includes storage system 945, processing system 950, and communication interface 960. Processing system 950 is operatively linked to communication interface 960 and storage system 945. Communication interface 960 may be communicatively linked to storage system 945 in some implementations. Computing system 900 may further include other components such as a battery and enclosure that are not shown for clarity.

Communication interface 960 comprises components that communicate over communication links, such as network cards, ports, radio frequency (RF), processing circuitry and software, or some other communication devices. Communication interface 960 may be configured to communicate over metallic, wireless, or optical links. Communication interface 960 may be configured to use Time Division Multiplex (TDM), Internet Protocol (IP), Ethernet, optical networking, wireless protocols, communication signaling, or some other communication format—including combinations thereof. Communication interface 960 is configured to communicate with at least edges of a computing environment to configure the edges via the control plane. In some implementations, communication interface 960 may further communicate with one or more host computing systems to configure traffic groups at the host computing systems, wherein the traffic groups select an edge from the edges for an egress packet from the host.

Processing system 950 comprises microprocessor and other circuitry that retrieves and executes operating software from storage system 945. Storage system 945 may include volatile and nonvolatile, removable and non-removable media implemented in any method or technology for storage of information, such as computer readable instructions, data structures, program modules, or other data. Storage system 945 may be implemented as a single storage device but may also be implemented across multiple storage devices or sub-systems. Storage system 945 may comprise additional components, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 950 is typically mounted on a circuit board that may also hold the storage system. The operating software of storage system 945 comprises computer programs, firmware, or some other form of machine-readable program instructions. The operating software of storage system 945 comprises configure service 930 that provides at least method 200 of FIG. 2. The operating software on storage system 945 may further include an operating system, utilities, drivers, network interfaces, applications, or some other type of software. When read and executed by processing system 950 the operating software on storage system 945 directs computing system 900 to operate as described herein.

In at least one implementation, configure service 930 directs processing system 950 to identify an edge from a plurality of edges to support a private network tunnel, wherein the private network tunnel may comprise an IPsec tunnel in some examples. The edge may be identified by administrator, may be identified based on resources available on the edge, may be randomly selected, or may be identified in some other manner. In addition to identifying the gateway to support the private network tunnel, configure service 930 further directs processing system 950 to identify addressing attributes associated with communications directed over the private network tunnel. The addressing attributes may be identified at least in part from information provided by the remote gateway for the tunnel, wherein the remote gateway may advertise addresses available behind the remote gateway. In other examples, at least a portion of the addressing information may be provided by an administrator. The addressing information may include source IP addresses, destination IP addresses, or some other addressing information to identify packets to be communicated over private network tunnel. For example, addressing information may indicate that packets with a first source IP address and a first destination IP address should be communicated over the private network tunnel.

Once the addressing information is identified, configure service 930 directs processing system 950 to configure the edges of the computing environment to forward packets associated with the addressing attributes to the identified edge for the private network tunnel. In some implementations, configuring the edges may comprise configuring at least one routing table in each of the edges other than the identified edge to forward packets associated with the addressing attributes to the identified edge. As an example, a packet can be communicated to a first edge for stateful processing. The first edge may, prior to providing the stateful processing, determine whether the packet qualifies to be forwarded to the identified edge based on a comparison of the addressing attributes in the packet to the addressing attributes provided by the configure service 950. If the packet does not qualify, then the packet will not be forwarded to the identified edge and will instead have stateful processing at the first edge. In contrast, if the packet does qualify, then the packet will be forwarded to the identified edge, wherein the identified edge may provide the stateful processing and communicate the packet over the private network tunnel.

In some implementations, configure service 930 further directs processing system 950 to configure the hosts in a computing environment to select edges for egress packets based on traffic groups, wherein the hosts may select an edge based on addressing information in the egress packet. The addressing information may include at least the source IP address in some examples. The traffic groups may be configured by an administrator, may be based on load balancing, or may be configured in some other manner. Advantageously, by configuring the hosts, the edges may not be responsible for redirecting packets to maintain the stateful packet processing. Specifically, when the hosts are not configured with traffic groups, the hosts may select any edge in the plurality of edges to send a packet. The host may select the edge randomly, based on a load balancing algorithm, or some other form of ECMP. Once the packet is forwarded to the edge, the edge may hash addressing information in the packet to select the appropriate edge for the stateful processing. When the traffic groups are configured by computing system 900, the hosts may direct packets directly to an edge associated with the stateful processing without requiring punting based on a hash of the addressing information. In some environments, computing system 900 may be incapable of configuring the traffic groups, such as cloud service providers.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   identifying an edge gateway from a plurality of edge gateways to support a private network tunnel, wherein the plurality of edge gateways forms a cluster for load balancing gateway services;
   identifying addressing attributes associated with communications directed over the private network tunnel; and
   configuring the plurality of edge gateways to forward packets associated with the addressing attributes to the identified edge gateway.

2. The method of claim 1, wherein the addressing attributes comprise at least a destination internet protocol address.

3. The method of claim 2, wherein the addressing attributes further comprise at least a source internet protocol address.

4. The method of claim 1 further comprising:
   receiving a packet at a second edge gateway of the plurality of edge gateways;
   in the second edge gateway, determining that second addressing attributes in the packet qualify the packet to be forwarded to the edge gateway based on a comparison of the second addressing attributes to the addressing attributes; and
   in the second edge gateway and in response to determining that the second attributes in the packet qualify the packet to be forwarded to the edge gateway, forwarding the packet to the edge gateway.

5. The method of claim 4 further comprising:
   in the edge gateway, receiving the packet;
   in the edge gateway, processing the packet via at least one stateful service; and
   in the edge gateway, forwarding the packet via the private network tunnel.

6. The method of claim 5 further comprising:
   in a third edge gateway, receiving the packet;

in the third edge gateway, hashing at least one addressing attribute in the packet to select the second edge gateway from the plurality of edge gateways; and in the third edge gateway, forwarding the packet to the second edge gateway.

7. The method of claim 6, wherein the at least one addressing attribute comprises a source internet protocol address.

8. The method of claim 1, wherein the private network tunnel comprises an IPsec tunnel.

9. The method of claim 1, wherein configuring the plurality of edge gateways to forward packets associated with the addressing attributes to the identified edge gateway comprises configuring at least one routing table in each of the plurality of edge gateways other than the identified edge gateway to forward packets associated with the addressing attributes to the identified edge gateway.

10. A computing apparatus comprising:
a storage system;
a processing system operatively coupled to the storage system; and
program instructions stored on the storage system that, when executed by a processing system, direct the computing apparatus to:
identify an edge gateway from a plurality of edge gateways to support a private network tunnel, wherein the plurality of edge gateways forms a cluster for load balancing gateway services;
identify addressing attributes associated with communications directed over the private network tunnel; and
configure the plurality of edge gateways to forward packets associated with the addressing attributes to the identified edge gateway.

11. The computing apparatus of claim 10, wherein the addressing attributes comprise at least a destination internet protocol address.

12. The computing apparatus of claim 11, wherein the addressing attributes further comprise at least a source internet protocol address.

13. The computing apparatus of claim 10, wherein the program instructions further direct the computing apparatus to:
receive a packet at a second edge gateway of the plurality of edge gateways;
in the second edge gateway, determine that second addressing attributes in the packet qualify the packet to be forwarded to the edge gateway based on a comparison of the second addressing attributes to the addressing attributes; and
in the second edge gateway and in response to determining that the second attributes in the packet qualify the packet to be forwarded to the edge gateway, forward the packet to the edge gateway.

14. The computing apparatus of claim 13, wherein the program instructions further direct the computing apparatus to:
in the edge gateway, receive the packet;
in the edge gateway, process the packet via at least one stateful service; and
in the edge gateway, forward the packet via the private network tunnel.

15. The computing apparatus of claim 14, wherein the program instructions further direct the computing apparatus to:
in a third edge gateway, receive the packet;
in the third edge gateway, hash at least one addressing attribute in the packet to select the second edge gateway from the plurality of edge gateways; and
in the third edge gateway, forward the packet to the second edge gateway.

16. The computing apparatus of claim 15, wherein the at least one addressing attribute comprises a source internet protocol address.

17. The computing apparatus of claim 10, wherein the private network tunnel comprises an IPsec tunnel.

18. The computing apparatus of claim 10, wherein the plurality of edge gateways to forward packets associated with the addressing attributes to the identified edge gateway comprises configuring at least one routing table in each of the plurality of edge gateways other than the identified edge gateway to forward packets associated with the addressing attributes to the identified edge gateway.

19. A system comprising:
a plurality of edge gateways; and
a control system configured to:
identify an edge gateway from the plurality of edge gateways to support a private network tunnel, wherein the plurality of edge gateways forms a cluster for load balancing gateway services;
identify addressing attributes associated with communications directed over the private network tunnel; and
configure the plurality of edge gateways to forward packets associated with the addressing attributes to the identified edge gateway.

20. The system of claim 19, wherein the addressing attributes comprise at least a destination internet protocol address.

* * * * *